(12) United States Patent
Charkoudian et al.

(10) Patent No.: US 9,623,353 B2
(45) Date of Patent: Apr. 18, 2017

(54) CROSSLINKED CELLULOSIC NANOFILTRATION MEMBRANES

(71) Applicant: EMD Millipore Corporation, Billerica, MA (US)

(72) Inventors: John Charkoudian, Carlisle, MA (US); John P. Puglia, Townsend, MA (US); Nicole Fox, Lowell, MA (US)

(73) Assignee: EMD Millipore Corporation, Billerica, MA (US)

( * ) Notice: Subject to any disclaimer, the term of this patent is extended or adjusted under 35 U.S.C. 154(b) by 99 days.

(21) Appl. No.: 14/281,428

(22) Filed: May 19, 2014

(65) Prior Publication Data

US 2014/0250669 A1    Sep. 11, 2014

Related U.S. Application Data

(62) Division of application No. 11/827,516, filed on Jul. 12, 2007, now abandoned.

(60) Provisional application No. 60/837,381, filed on Aug. 11, 2006.

(51) Int. Cl.
| B01D 67/00 | (2006.01) |
| B01D 71/10 | (2006.01) |
| B01D 39/16 | (2006.01) |
| C08B 15/00 | (2006.01) |
| C08L 1/02  | (2006.01) |
| B01D 39/18 | (2006.01) |

(52) U.S. Cl.
CPC ......... *B01D 39/1676* (2013.01); *B01D 39/18* (2013.01); *B01D 67/0093* (2013.01); *B01D 71/10* (2013.01); *C08B 15/005* (2013.01); *C08L 1/02* (2013.01); *B01D 2323/283* (2013.01); *B01D 2323/30* (2013.01); *B01D 2325/36* (2013.01); *Y10T 29/49885* (2015.01)

(58) Field of Classification Search
None
See application file for complete search history.

(56) References Cited

U.S. PATENT DOCUMENTS

| 3,585,126 A | 6/1971 | Cannon et al. |
| 3,620,970 A | 11/1971 | Klug et al. |
| 3,864,289 A | 2/1975 | Rendall |
| 4,510,047 A | 4/1985 | Thompson |
| 4,604,326 A | 8/1986 | Manabe et al. |
| 4,704,324 A | 11/1987 | Davis et al. |
| 4,778,601 A | 10/1988 | Lopatin et al. |
| 4,839,203 A | 6/1989 | Davis et al. |
| 4,853,129 A | 8/1989 | Wan |
| 5,522,601 A | 6/1996 | Murphy |
| 5,522,991 A | 6/1996 | Tuccelli et al. |
| 5,739,316 A | 4/1998 | Beer et al. |
| 6,113,794 A | 9/2000 | Kumar et al. |
| 7,555,195 B2 | 6/2009 | Yamashita et al. |
| 2003/0121844 A1 | 7/2003 | Koo et al. |
| 2004/0206693 A1 | 10/2004 | Charkoudian et al. |
| 2004/0206694 A1 | 10/2004 | Charkoudian |
| 2005/0272925 A1 | 12/2005 | Charkoudian et al. |
| 2006/0096912 A1 | 5/2006 | Nussbaumer et al. |

FOREIGN PATENT DOCUMENTS

| DE | 19545701 C1 | 5/1997 |
| DE | 102004053787 A1 | 5/2006 |
| EP | 0257635 A2 | 3/1988 |
| JP | 2000-51277 A | 2/2000 |
| WO | 97/20622 A1 | 6/1997 |

OTHER PUBLICATIONS

Extended European Search Report received for EP patent Application No. 07114167.5, mailed on Nov. 6, 2007, 7 pages.
Extended European Search Report received for EP Patent Application No. 10181774.0, mailed on Nov. 25, 2010, 5 pages.
Bhanushali et al., "Advances in Solvent-Resistant Nanofiltration Membranes: Experimental Observations and Applications", Annals. of the New York Academy of Sciences, vol. 984, Mar. 2003, pp. 159-177.
Ebert et al., "Solvent Resistant Nanofiltration Membranes in Edible Oil Processing", Membrane Technology, vol. 107, 1999, pp. 5-8.
Granath et al., "Molecular Weight Distribution Analysis by Gel Chromatography on Sephadex", Journal of Chromotography A, vol. 28, 1967, pp. 69-81.
Guo et al., Chinese Chemical Letters, vol. 5, No. 10, 1994, pp. 869-872.
Zeman et al., "Steric Rejection of Polymeric Solutes by Membranes with Uniform Pore Size Distribution". Separation Science and Technology, vol. 16, No. 3, Apr. 1981, pp. 275-290.
Zwijnenberg et al., "Acetone-Stable Nanofiltration Membranes in Deacidifying Vegetable Oil", Journal of the American Oil Chemists' Society, vol. 76, No. 1, 1999, pp. 83-87.
European communication dated Jan. 2, 2017 in corresponding European patent application No. 10181774.0.

*Primary Examiner* — Krishnan S Menon
(74) *Attorney, Agent, or Firm* — Nields, Lemack & Frame, LLC

(57) ABSTRACT

The present invention relates to a nanofilter formed by using a porous ultrafiltration membrane as a precursor, and carefully controlling reaction conditions so as to maintain sufficient hydrophilic nature of the membrane while causing the pore structure to close to a nanofilter range (less than 400 Daltons). This produces a solvent stable cellulose nanofiltration membrane capable of operating at satisfactory flux in aqueous solutions, and being low binding to organic biomaterials.

17 Claims, No Drawings

CROSSLINKED CELLULOSIC NANOFILTRATION MEMBRANES

CROSS REFERENCE TO RELATED APPLICATIONS

The present patent application is a Divisional Application of U.S. patent application Ser. No. 11/827,516, filed on Jul. 12, 2007, which claims the benefit of U.S. Provisional Patent Application No. 60/837,381, filed on Aug. 11, 2006 and is hereby incorporated by reference in it's entirety.

FIELD

The present invention relates to a solvent resistant membrane and a method of making it. More particularly it relates to a solvent nanofiltration membrane and method of making it.

BACKGROUND OF THE INVENTION

Nanofiltration (NF) membranes have retention characteristics in the range between ultrafiltration and reverse osmosis. Nanofiltration membranes are used to remove multivalent ions and small organic molecules in the molecular weight range of approximately 200-1000 Daltons. The ability to remove small organic molecules has led to much interest for applications in pharmaceutical industries. In particular, there is an interest in operating in organic solvent streams to separate small molecules such as synthetic antibiotics and peptides from organic solutions. In these types of applications, a high permeability is required for economical operation.

Polar organic solvents, such as dipolar aprotic solvents, particularly solvents such as N-methyl pyrrolidone (NMP), dimethylacetamide (DMAC), and dimethylsulfoxide (DMSO) are used as solvents or media for chemical reactions to make pharmaceuticals and agrochemicals (for example, pyrethroid insecticides) industry. These powerful solvents will cause severe damage to commonly used polymeric membrane titters made from polysulfone, polyethersulfone, polyacrylonitrile or polyvinylidene fluoride polymers.

In many applications, it would be useful for the membrane to operate with aqueous mixtures of solvents or with both aqueous solutions and solvent based solutions in series. For such uses, hydrophobic membranes are not useful as they have very low permeabilities for aqueous solutions. Low aqueous permeability in hydrophobic NF membranes is shown in *Advances in Solvent-Resistant Nanofiltration Membranes*, Ann. N.Y. Acad. Sci. 984 159-177 2003.

A typical use for these membranes is to concentrate products in organic or aqueous/organic solutions prior to a crystallization step. In other applications, process operators are able to remove low molecular weight impurities and salts by diafiltration, which cannot be done with an evaporation step. Operators are also able to exchange solvents during this type of filtration process. Nanofiltration of organic solutions can replace vacuum flash evaporators or rotovaps, providing a lower capital cost process.

In the processing of peptides and other low molecular weight organic solutes, the capacity of the membrane to be non-binding is an important attribute. Solutes bound to the membrane lower permeability and reduce yield by irreversibly holding solute. Cellulose is well-known as having a very low binding surface for such molecules, whereas hydrophobic and the typical polyamide NF membranes are known to be highly binding.

Cellulose is solvent stable, being soluble only in strong solvents such as carbon disulfide and solutions of dimethylacetamide with lithium chloride. When crosslinked, cellulose has even less tendency to swell and is therefore a good candidate for a solvent stable NF membrane. To date no commercial membrane has been produced because of the difficulties involved in making a porous NF membrane from cellulose.

Rendall, in U.S. Pat. No. 3,864,289, describes a process for the preparation of a cellulosic semipermeable membrane from a formulation containing a cellulosic membrane material, a cellulosic crosslinking agent and a blocking agent. The use of a "blocking agent" is undesirable because it adds unnecessary complexity to the process and an additional chemical change to the nature of the membrane material. Such blocking agents can also add to undesirable extractable material which can contaminate the purified permeate.

Wan, in U.S. Pat. No. 4,853,129, describes regenerated cellulose membranes for separating organic liquids, such as ketone dewaxing solvents from dewaxed oil. Reacting regenerated cellulose membranes with a bifunctional reagent results in improvement of the membrane's selectivity in organic liquid separations applications. Wan states that the process also serves to reduce the hydrophilicity of the membranes, and that by use of the crosslinking agents no unreacted hydroxy groups are left after reaction, nor are any hydroxy groups introduced by the crosslinking agent. Such membranes would not be suitable fur use with water solutions, or solutions with appreciable amounts of water.

The membranes in the Wan patent have rejection values for oils of molecular weights in the range of from about 300-600 Daltons of 55%-90%. (Molecular weight data from concurrent U.S. Pat. No. 4,510,047.) These rejections are not suitable for the high value added products of pharmaceutical manufacturers.

Beer et al, in U.S. Pat. No. 5,739,316, claims as process for making a cross-linked cellulose hydrate ultrafiltration membrane comprising contacting a cellulose hydrate membrane with an aqueous alkaline solution of a water soluble diepoxide. Besides being limited to water soluble diepoxides. Beer teaches away from the use of organic solvents in the reactions as being technically difficult and expensive. Moreover, Beer states as an objective of his invention a process that does not modify the high flux of the membrane. This means that the membranes so produced would not have increased rejection from the initial ultrafiltration membrane.

Charkoudian, in U.S. patent application Ser. Nos. 11/199, 491 and 10/414,988 teaches crosslinked and crosslinked and charged cellulose ultrafiltration membranes that retain the ultrafiltration structure of the membranes.

U.S. Pat. No. 6,113,794 describes a nanofiltration composite membrane comprising a substrate ultrafiltration membrane formed from non-cross-linked ethylenically unsaturated nitrile polymer, and a porous coating of a cross-linked hydrophilic polymer having a molecular weight of 20,000 to 2,000,000 and containing reactive functional groups, formed from an aqueous solution of the polymer containing 1.5-2.5% w/w of the polymer. The patent is directed to chitosan coated membranes that are completely dried before being crosslinked. This will produce a dense film rather than a porous membrane.

The U.S. Pat. No. 6,113,794 patent cannot be used with dipolar aprotic solvents such as N-methyl pyrrolidone or dimethylacetamide because such solvents will dissolve the support layer and destroy the composite membrane.

Guo et al in Chinese Chemical Letters, Vol 5, (10) pp 869-872 1994 reports on crosslinking large pore cellulose membranes with DMSO aqueous alkaline solutions of epoxyl propane chloride (epichlorohydrin). These membranes were used for affinity separations. Such large pore membranes would not be suitable for small molecule separations, and there is no teaching that the method could be used to make ultrafiltration or NF membranes.

Several patent applications and articles have been published by authors primarily associated with GKSS Research Center. These all appear to be based on the same technology. This method (WO 97/20622) coats a substrate membrane with a low solids solution of cellulose-hydroxyether, such as hydroxyethylcellulose or hydroxypropyl cellulose, and then crosslinks the coating with aldehyde, preferably a dialdehyde to the point of water insolubility. In an article in JAOCS Vol 76#1, pp 83-87 1999, Zwijnenberg et al report on nanofiltration of vegetable oils in acetone using composite membranes with a "cellulose-type top-layer." In Membrane Technology #107 pp 5-8 1999, Ebert et al report on nanofiltration of vegetable oils in solvents with "cellulose-type" membranes in which the performance of the cellulose type membranes is influenced by the crosslinking conditions. Cellulose hydroxyethers are a different class of material from regenerated cellulose, as can be sea by the referenced authors describing the material as cellulose-like. Cellulose hydroxyethers are water soluble and can be expected to behave differently from regenerated cellulose membranes in operation. The membranes made from cellulose hydroxyethers are formed from thin dense layers and will have a different structure than the regenerated cellulose made by phase separation methods.

The inventors of the present invention have found that by using a porous ultrafiltration membrane as a precursor, and carefully controlling reaction conditions so as to maintain sufficient hydrophilic nature of the membrane, they can produce a solvent stable cellulose nanofiltration membrane capable of operating at satisfactory flux in aqueous solutions, including aqueous-solvent mixtures or blends, which is also low binding to organic biomaterials.

SUMMARY OF THE INVENTION

The present invention is a cross-linked cellulose nanofiltration membrane capable of filtering solutes from organic solvents, including dipolar aprotic solvents, aqueous solutions, and mixtures of water and organic solvents.

The membrane comprises obtaining a preformed porous support capable of operation in dipolar aprotic solvents, forming a cellulose ultrafiltration membrane on said support, and crosslinking the cellulose membrane in a controlled manner so as to render the resultant nanofiltration membrane capable of retaining solutes of greater than about 200 Daltons.

A preferred embodiment of the membrane has a microporous membrane capable of operation in dipolar aprotic solvents as a support. A more preferred embodiment has a microporous membrane support made from ultrahigh molecular weight polyethylene as a support.

In an embodiment, the cellulose ultrafiltration precursor membrane has a molecular weight cutoff of less than about 5000 Daltons.

In an embodiment, the nanofiltration membrane comprises a hydrophilic nanofiltration membrane comprising crosslinked cellulose capable of operation in dipolar aprotic solvents.

In an embodiment, the nanofiltration membranes comprise crosslinked cellulose, capable of operation in dipolar aprotic solvents, said membrane comprising a cellulose ultrafiltration membrane reacted with a multifunctional crosslinking reagent through hydroxyl groups in the glucose units, under conditions whereby sufficient hydroxyl groups are left unreacted to provide a hydrophilic membrane and whereby the resultant filter is a nanofilter.

In an embodiment, the nanofiltration membrane comprises hydrophilic nanofiltration membranes comprising crosslinked cellulose capable of operation in dipolar aprotic solvents, suitable for removing organic solutes of greater than about 400 Daltons from organic solvent solutions.

In an embodiment, the invention comprises a method of removing organic solutes from organic-aqueous or aqueous-organic solvent solutions comprising passing the solution through a hydrophilic crosslinked cellulose nanofiltration membrane, said membrane comprising a cellulose ultrafiltration membrane capable of operation in dipolar aprotic solvents.

In an embodiment, the invention comprises a method of removing organic solutes from organic-aqueous or aqueous-organic solvent solutions comprising passing the solution through a crosslinked cellulose nanofiltration membrane, said membrane comprising a cellulose ultrafiltration precursor membrane capable of operation in dipolar aprotic solvents, reacted with a multifunctional crosslinking reagent through hydroxyl groups in the glucose units, under conditions whereby sufficient hydroxyl groups are left unreacted to provide a hydrophilic membrane and render the membrane a nanofilter.

In an embodiment, the crosslinked cellulose nanofiltration membranes have controlled amounts of either negative or positive charge. Charge added to the membrane's internal and external surfaces has been shown to provide improved retention of similarly charged molecules.

The membrane is used to remove or concentrate organic or inorganic solutes of from about 200 kD to 1000 kD from the feed solution by sealing the membrane in a pressure holding device, such as a spiral wound module, a pleated cartridge, or a plate and frame type cassette, or other device, so that one side faces the higher pressure feed side and the other side of the membrane is at the lower pressure permeate stream. A pressurized feed solution stream is introduced to the cellulose side of the membrane and the permeate liquid collected from the lower pressure downstream side of the membrane. Solutes greater than about 200 kD are retained (rejected) on the upstream side of the membrane. Lower molecular weight solutes, such as solvents pass through the membrane. Additionally, other low molecular weight solutes, such as salts and ions also pass through the nanofilter membrane providing a concurrent desalting of the solute.

In some applications, after concentration of the desired solute, one or more other solutes may be added to the upstream side to exchange solvents. Also, pure solvent of the kind used in the original solution may be added to the concentrated solute to produce a purer solution relative to the original feed, now that low molecular impurities have been removed by passage through the membrane.

DETAILED DESCRIPTION OF THE INVENTION

The inventive nanofiltration membrane comprises a crosslinked cellulosic membrane, preferably integral with a support layer. The cellulosic membrane is made from a cellulosic ultrafiltration membrane preferably made by the process of U.S. Pat. No. 5,522,991 (which is incorporated herein by reference). The change in the membrane caused by the crosslinking reaction is from a membrane that separates primarily by size (ultrafiltration) to one where other interactions between the pore materials and the solutes play an important role in rejection of solutes. In nanofiltration, the forces on the solute molecule that retard entrance of solute into the pores, or transport through the porous nature of the membrane derive from the nature of the membrane material and the intimacy of solute to the pore surface. Charge and dielectric constant effects on the solute and solvent in the pores affect transport through the pores in a manner absent in the larger pores of ultrafiltration membranes. Therefore, when making a nanofiltration membrane by the process of the present invention, the pore size was reduced to obtain a porous structure in which solute-membrane material interactions were important, and where rejection simply by size was not the only mechanism.

Supports suitable for the present invention can be made from polymers such as Polyethylene, polypropylene, or polyether-ether ketone (PEEK) capable of operation in dipolar aprotic (e.g. DMSO, DMF, NMP) solvents. Supports need to combine porosity for flow, mechanical strength and flexibility and resistance to swelling or dissolution by organic solvents. Supports may be non-woven or woven fabrics: made from, for example, polyolefins, polyethylene terephtalate, or fluorinated polymers such as polytetrafluoroethylene. A preferred support is a microporous membrane. A more preferred support is a microporous membrane made from ultrahigh molecular weight polyethylene (UPE) produced by the process described in U.S. Pat. No. 4,778,601.

Cellulose membranes can be formed by immersion casting of a cellulose acetate or other cellulose ester polymer solution onto a support. The cellulose ester is then hydrolyzed to cellulose by using a strong base such as 0.5N NaOH. A preferred method of making a cellulose ultrafiltration membrane is described in U.S. Pat. No. 5,522,601 wherein a solution of cellulose acetate is coated onto a UPE microporous membrane and coagulated into a membrane. The membrane is then hydrolyzed with sodium hydroxide to form the cellulose membrane.

Alternatively, cellulose can be dissolved in solutions of solvents such as dimethylacetamide (DMAC) or N-methyl pyrrolidone (NMP) with the addition of a salt such as lithium chloride. This cellulose solution can be used to form the membrane and subsequently eliminate the need for base hydrolysis.

Cellulose ultrafiltration hollow fiber membranes can be made by spinning a cuprammonium solution of cellulose into an acetone-water coagulating solution as described in U.S. Pat. No. 4,604,326. A similar process can be used to produce flat sheet membranes.

These examples are not to limit the methods possible to make cellulose ultrafiltration membranes, but as examples of some of the various methods available to a practitioner of this art.

Preferred cellulose membranes have molecular weight cutoff (MWCO) values of 10,000 Daltons (D) or lees, more preferred cellulose membranes have MWCO less than 5000 D. A preferred membrane is PLCCC, produced by Millipore Corporation of Billerica, Mass.

Crosslinking comprises a heterogeneous reaction between the dissolved crosslinking reactant and a membrane. The reaction solution can be based on an aqueous or an organic solvent, or an aqueous-organic mixture. Preferred organic solvents are N-methyl pyrrolidone, dimethyl acetamide, dimethyl sulfoxide, dimethyl formamide or similar solvents.

Typical crosslinkers are di- or multi-functional epoxides. Examples are epichlorohydrin, butandioldiglycidyl ether (BUDGE), ethylenedioldiglycidyl ether (EDGE), polyethyleneglycoldiglyciyl ethers, and butane diepoxide. Multifunctional N-methyl methoxy compounds may also be used as crosslinking reagents. Examples are Cymel 385 and Powderlink 1174, both available from Cytec Industries of West Patterson, N.J.

Crosslinker concentration in the reaction solution is about 5% by weight to about 60% by weight, with a preferred range of about 10% to about 40% by weight.

A skilled practitioner will determine the reaction based on reaction temperature and reaction conditions. Generally, the reaction will take place at a faster rate at higher temperatures. A larger reaction vessel will require more time to reach the reaction temperature and to cool down. Higher pressures may be used to increase reaction rate. Depending on the reaction vessel, the practitioner may use a continuous flow, stirred tank or other means to improve contact of reactants to the membrane and thereby control the reaction. Higher concentrations will increase reaction rate. Cross-linker type as well as solvent will also play a role in determining reaction time. Hydroxyl ion activity is another important reaction condition.

Preferred reaction times are from about two to about one hundred hours with preferred reaction times of about 4 to about 24 hours. The reaction can be run at room temperature, and up to about 60° C., with preferred temperatures being from 25° C. to about 50° C. One of ordinary skill in the art will be able to modify or reduce this time by increasing for example the mass transfer rates, by using a continuous web or by further increasing reaction rates by adjusting temperature, concentrations and other like parameters.

When a multifunctional epoxy is used, the reaction is run at basic conditions. Sodium or potassium hydroxides are generally used. Typically about 0.1 M to about 1M hydroxide solutions are used. The skilled practitioner will be able to balance the reaction against alkaline deterioration of the cellulose. Higher hydroxide concentrations and higher reaction temperatures will accelerate alkaline deterioration, lower concentrations of hydroxide and lower temperatures will slow deterioration rate as well as crosslinking reaction rate.

Powderlink 1174, Cymel 385 and similar crosslinking agents (multifunctional N-methyl methoxy compounds) crosslink cellulose through the hydroxyls on the cellulose with an acid catalyst, such as toluenesulfonic acid. Other similar acid catalysts are organic sulfonic acids and non-oxidizing mineral acids. Weak or moderately acid conditions, of pH about 2 to 4, are appropriate. A preferred catalyst is Cycat 4040, a sulfonic acid catalyst available from Cytec Industries. While more acidic conditions may increase the reaction rate, the practitioner must take care not to cause acid deterioration of the cellulose membrane.

The reaction between the cellulose membrane and the crosslinking reactants can be done in aqueous solutions, either 100% water or mixed with solvents such as methylethyl ketone, methylpentanediol, acetone, other ketones. This list is not limiting. A skilled practitioner will be able to develop this method using convenient and solvents suitable to their requirements.

The surface charge of the present invention can be made to have a negative charge, either through a one step or two step process. In the one step process, the charge modifying reactant is added to the crosslinking solution. In the two step method, the charge adding reaction is conducted before or after the crosslinking reaction.

Suitable reactants for forming a negatively charged membrane include compounds of the structure $X(CH_2)_mA$ or alkali metals salts thereof. X is a halogen, preferably chloride or bromide. A is carboxyl or sulfonate. Reaction time, reactant concentration, pH, and temperature are used to control the amount of negative charge added to the surfaces of the membrane.

Positive charge may be imparted to the membrane by the use of glycidyl quaternary ammonium compounds and quaternary ammonium alkyl halides. These molecules would have a structure of $Y(CH_2)_mB$ where Y is a halogen and B is a positively charge moiety.

In the present invention, the cross-linking reaction is preferably done before charging, i.e., adding charged groups to the membrane, because as charged groups are added, charge repulsion between like-charged groups causes polymer and membrane swelling, which can have a detrimental effect on membrane properties. It is possible to crosslink and add charge simultaneously, if the crosslinking reaction is controlled at a rate where the crosslinked membrane resulting can restrain potential swelling by the added charge.

Practitioners will be able, with routine laboratory work, using the teachings herein, to produce nanofiltration membranes with the proper balance of pore size, charge and other material properties to have a working and economically viable solvent resistant nanofiltration membrane.

Dextran Test

This test is based upon methods published, by L. Zeman and M. Wales, "Separation Science and Technology" 16(3) p 275-390 (1981).

A sample of wetted membrane is placed in a test cell. A feed solution containing a mixture of dextrans having nominal molecular weights from 10,000 to 2,000,000 Daltons is contacted in a continuous flow mode or in a stirred cell with the upstream side of the membrane. The permeation rate is controlled by a peristaltic pump in order to run at low flux, and thereby eliminate concentration polarization on the feed side.

Samples of the permeate are examined for their molecular weight distribution (MWD) by size exclusion chromatography. The resulting distribution is compared to the MWD of the feed solution. A rejection at any elution volume can be calculated from $R_2=(h(f)_v-h(p)_p)/h(f)_v$ where $h(f)_v$ is the height of the feed solution chromatograph at elution volume v, and $h(p)_v$ is that of the permeate solution at volume v. In this way a distribution of rejections as a function of v can be found. The relation between elution volume and molecular weight of the solute is determined from the known MWD supplied by the manufacturer of the dextran. Molecular size can be calculated from the molecular weights by the relation of Granath and Kuist, J. Chromatography 28 p 69-81 (1967). In this way a rejection vs. size distribution curve is generated.

A measure of MWCO is to determine the molecular weight at 90% rejection (R90) and consider that as the MWCO of the membrane.

Retention Test

Membrane discs were placed in a pressure cell having an inlet for the feed stream and to allow pressure to be applied, and an outlet for permeating liquid. Tests were done with dilute magnesium sulfite and raffinose solutions at 50 psi. Raffinose concentration in feed and permeate were determined by with refractive index detection. Magnesium sulfate concentrations were determined by conductivity.

EXAMPLES

A. Aqueous Solutions

PLCCC is a cellulose ultrafiltration membrane made by Millipore Corporation of Billerica, Mass. It has a rated molecular weight cutoff as specified in the manufacturer's literature of 5000 Daltons.

BUDGE is butanediol diglycidylether used as a crosslinking agent.

EDGE is Ethylene glycol diglycidylether used as a crosslinking agent.

Example 1

A niece of PLCCC membrane 85 mm×165 mm, is treated with a solution of 40 grams of ethyleneglycol diglycidylether (EDGE) dissolved in 60 grams 0.1M NaOH for 6 hours at 40 degrees C. by rolling the membrane with the EDGE solution in a glass jar placed in a temperature controlled TECHNE HB1D hybridizer. The membrane is washed three times with 200 cc of Milli-Q® water. It is stored until use in 200 cc of Milli-Q® water containing 0.01% sodium azide to prevent bacterial contamination. (Membrane #1).

Membrane 1 was tested for its rejection of neutral dextrans and its buffer flux according to the Dextran Test described above. The molecular weight at which 90% of the dextrans are rejected (R90) is tabulated in Table 1 along with the value for the PLCCC control. Also shown in Table 1 is the buffer flux for Membrane 1 and the PLCCC control.

Membrane 1 was tested for its ability to reject MgSO4 according to the Retention Test described above. A 0.2% aqueous MgSO4 solution was prepared and its conductivity measured to give 2.34 millliSiemens (mS). The membrane was placed in a high pressure filtration stirred cell. The 0.2% feed solution was passed through Membrane 1 at a pressure of 50 psi and a stirring rate of 150 rpm. The conductivity of the filtrate was 0.68 mS which corresponds to a concentration of 0.04% MgSO4. This is a reduction of about 80% of the feed MgSO4. The flux of this membrane during the nanofiltration experiment was 0.24 lmh/psi. This data is given in Table 2.

Membrane 1 was also tested for its ability to reject raffinose according to the Retention Test described above. Raffinose is a small sugar molecule with a molecular weight of 594 Daltons. A 0.1% aqueous raffinose solution was prepared a processed using the same cell and settings as for the MgSO4 experiment above. The feed solution and the filtrate were analyzed for their raffinose concentration by HPLC using a refractive index (RI) detector. A 91% reduction in raffinose concentration was recorded after being processed with membrane 1. This data is shown in Table 2.

B. Organic Solutions

Example 2

A piece of PLCCC membrane, 85 mm×165 mm, is treated with a solution of 20 grams of butanediol diglycidylether (BUDGE) dissolved in 40 grams N-methylpyrrolidone and 40 grams of 0.5M NaOH for 90 hours at 24 degrees C. by rolling the membrane with the BUDGE solution in a glass jar placed in a temperature controlled hybridizer. The membrane is washed once with 200 cc of methanol and twice with 200 cc of Milli-Q® water. It is stored until use in 200 cc of Milli-Q® water containing 0.01% sodium azide to prevent bacterial contamination. (Membrane #2.)

Membrane 2 was tested for its rejection of neutral dextrans and its buffer flux according to the Dextran Test described above; these values are given in Table 1.

Membrane 2 was tested for its ability to reject raffinose in isopropyl alcohol (IPA) according to the Retention Test described above. A 0.1% solution of raffinose in IPA was processed with Membrane 2 at 50 psi. After passing through Membrane 2, the concentration was reduced to 0.029%. This is a decrease of 71% relative to the feed concentration. These data along with the flux and stir rate are shown in Table 3.

The dramatic difference in rejection seen for raffinose in DMAC compared tp isopropyl alcohol demonstrates that pore size alone does not control rejection, but that the interaction of solute/membrane is important.

Example 3

A piece of PLCCC membrane, 85 mm×165 mm, is treated with a solution of 40 grams of butanediol diglycidylether (BUDGE) dissolved in 40 grams N-methylpyrrolidone and 40 grams of 0.5M NaOH for 40 hours at 24 degrees C. by rolling the membrane with the BUDGE solution in a glass jar placed in a temperature controlled hybridizer. After this period of time this solution was discarded and a fresh solution with the same composition was introduced for 5 hours at 40 degrees C. The membrane is washed once with 200 cc of methanol and twice with 200 cc of Milli-Q® water. It is stored until use in 200 cc of Milli-Q® water containing 0.01% sodium azide to prevent bacterial contamination. (Membrane #3).

Membrane 3 was tested for its rejection of neutral dextrans and its buffer flux according to the Dextran Test described above; these values are given in Table 1.

Membrane 3 was tested for its ability to reject raffinose in N-methylpyrollidone (NMP) according to the Retention Test described above. A 0.1% solution of raffinose in IPA was processed with Membrane 3 at 50 psi. After passing through Membrane 3, the concentration was reduced to below the detection limit of the HPLC equipment which is 0.005%. This corresponds to a decrease of at least 95% relative to the feed concentration. These data are listed in Table 3.

Example 4

A piece of PLCCC membrane, 85 mm×165 mm, is treated with a solution of 40 grams of ethyleneglycol diglycidylether (EDGE) dissolved in 60 grams 0.25M NaOH for 4 hours at 40 degrees C. by rolling the membrane with the EDGE solution in a glass jar placed in a temperature controlled hybridizer. The membrane is washed three times with 200 cc of Milli-Q® water. It is stored until use in 200 cc of Milli-Q water containing 0.01% sodium azide to prevent bacterial contamination. (Membrane #4.)

Membrane 4 was tested for its rejection of neutral dextrans and its buffer flux according to the Dextran Test described above. The molecular weight at which 90% of the dextrans are rejected (R90) is tabulated in Table 1 along with the value for the PLCCC control. Also shown in Table 1 is the buffer flux for Membrane 1 and the PLCCC control.

Membrane 4 was tested for its ability to reject raffinose in N-methylpyrollidone (NMP) according to the Retention Test described above. A 0.1% solution of raffinose in IPA was processed with Membrane 4 at 50 psi. After passing through Membrane 4, the concentration was reduced to below the detection limit of the HPLC equipment which is 0.005%. This corresponds to a decrease of at least 95% relative, to the feed concentration. These data are listed in Table 3.

TABLE 1

Membrane Characteristics Before and After Crosslinking to Form Nanofiltration Membrane

| Membrane Number | cross linking | R90 kDaltons | Buffer Flux lmh/psi |
|---|---|---|---|
| PLCCC | control | 2645 | 3.8 |
| 1 | EDGE | 544 | 0.2 |
| 2 | BUDGE | 1113 | 0.2 |
| 3 | BUDGE | 886 | 0.1 |
| 4 | EDGE | 602 | 0.2 |

TABLE 2

Aqueous Nanofiltration

| Membrane Number | cross linking | Feed | % Before Nano filtration | % After Nano filtration | % Reduction | Flux (lmh/psi) |
|---|---|---|---|---|---|---|
| PLCCC | control | 0.2% MgSO4 | 0.2 | 0.18 | 10 | 0.65 |
| 1 | EDGE | 0.2% MgSO4 | 0.2 | 0.04 | 80 | 0.2 |
| PLCCC | control | 0.1% raffinose | 0.1 | 0.08 | 20 | 0.65 |
| 1 | EDGE | 0.1% raffinose | 0.1 | 0.009 | 91 | 0.24 |

TABLE 3

Organic Solution Nanofiltration

| Membrane Number | cross linking | Feed | % Before Nano filtration | % After Nano filtration | % Reduction | Flux (lmh/psi) |
|---|---|---|---|---|---|---|
| PLCCC | control | 0.1% Raffinose/IPA | 0.1 | 0.09 | 10 | 0.008 |
| 2 | BUDGE | 0.1% Raffinose/IPA | 0.1 | 0.01 | 90 | 0.008 |
| 3 | BUDGE | 0.1% Raffinose/NMP | 0.1 | <0.005 | >95 | 0.01 |
| 1 | EDGE | 0.1% Raffinose/NMP | 0.1 | <0.005 | >95 | 0.01 |

Prophetic Charged Nanofiltration Membranes

Example 1

Negatively Charged 1

A piece of Membrane #1, 85 mm×165 mm, is treated with a solution of 22.5 grams of bromopropylsulfonic acid sodium salt (BPSA) in 100 grams of 0.5M NaOH for 4 hours at 25 degrees C. by rolling the membrane with the BPSA solution in a glass jar placed in a temperature controlled hybridizer. The membrane is washed three times with 200 cc of Milli-Q® water. It is stored until use in 200 cc of Milli-Q® water containing 0.01% sodium azide to prevent bacterial contamination. (Negatively Charged Membrane #1).

Example 2

Negatively Charged 2

The same BPSA reaction conditions as in Example 1 are employed except for reaction time which is allowed to proceed to 16 hours. This produces a sulfonic acid modified membrane with a higher amount of negative charge compared to 1 above. (Negatively Charged Membrane #2).

Example 3

Positive Charge 1

A piece of Membrane #1, 85 mm×165 mm, is treated with a solution of 15 grams of a 70-75% aqueous solution of glycidyltrimethylammonium chloride (GTMAC), 10 grams grams of 1M NaOH, and 75 grams of water for 3 hours at 25 degrees C. by rolling the membrane with the GTMAC solution in a glass jar placed in a temperature controlled hybridizer. The membrane is washed three times with 200 cc of Milli-Q® water. It is stored until use in 200 cc of Milli-Q® water containing 0.01% sodium azide to prevent bacterial contamination. (Positively Charge Membrane #1.)

Example 4

Positive Charge 2

The same GTMAC reaction conditions as in Example 1 is employed except for reaction time which was allowed to proceed to 16 hours. This produces a quaternary ammonium modified membrane with a higher amount of positive charge compared to 1 above. (Positively Charged Membrane #2).

What is claimed:

1. A method of forming an organic solvent resistant hydrophilic nanofilter having a porous support integral with a crosslinked hydrophilic cellulose ultrafiltration membrane, comprising:
    (a) providing a microporous support made from a polymer selected from polyethylene, polypropylene, polyether ether ketone, polyolefins, polyethylene terephthalate, fluorinated polymers, and ultrahigh molecular weight polyethylene;
    (b) providing a cellulose solution;
    (c) contacting said microporous support with said cellulose solution;
    (d) forming an ultrafiltration cellulose membrane having a molecular weight cutoff (MWCO) values of 10,000 Daltons (D) or less on said support;
    (e) providing a reactant solution containing a multifunctional crosslinking agent dissolved in an aqueous solvent, an organic solvent, or an aqueous-organic solvent mixture, said multifunctional crosslinking agent comprising a butanediol diglycidyl ether or ethylene glycol diglycidylether;
    (f) contacting said ultrafiltration cellulose membrane on said support with said reactant solution; and
    (g) crosslinking said ultrafiltration cellulose membrane on said support by reacting said multifunctional crosslinking agent in the reactant solution through hydroxyl groups in the cellulose, under conditions whereby sufficient hydroxyl groups present in the cellulose are left unreacted resulting in a hydrophilic crosslinked cellulose membrane containing nanofilter, wherein said nanofilter retains solutes greater than about 200 Daltons.

2. The method of claim 1, further comprising after step (g) attaching a negative surface charge or a positive surface charge to the surfaces of said hydrophilic crosslinked cellulose membrane.

3. The method of claim 1, wherein the reactant solution in step (e) further comprises a charge modifying reactant for providing a negative surface charge or a positive surface charge to the surfaces of said hydrophilic crosslinked cellulose membrane.

4. The method of claim 1, wherein said microporous support is selected from the group consisting of a polymeric woven fabric, a polymeric non-woven fabric and a polymeric membrane.

5. The method of claim 1, wherein said microporous support comprises an ultrahigh molecular weight polyethylene microporous membrane.

6. The method of claim 1, wherein said microporous support comprises polyethylene, polyethylene terephthalate or a fluorinated polymer.

7. The method of claim 1, wherein said cellulose solution comprises a cellulose ester solution.

8. The method of claim 7, wherein said cellulose ester is cellulose acetate.

9. The method of claim 8, wherein in said cellulose acetate is hydrolyzed to cellulose.

10. The method of claim 1, wherein said crosslinking agent is present from 5% by weight to 60% by weight of the reactant solution.

11. A method of forming an organic solvent resistant hydrophilic crosslinked cellulose containing nanofilter for removing or concentrating organic or inorganic solutes from aqueous, organic, or aqueous-organic solvent solutions comprising:
    (a) providing an ultrahigh molecular weight polyethylene microporous membrane support
    (b) providing a cellulose solution;
    (c) contacting said support with said cellulose solution;
    (d) forming an ultrafiltration cellulose membrane having molecular weight cutoff (MWCO) values of 5,000 Daltons (D) or less on said support;
    (e) providing a reactant solution containing a multifunctional crosslinking agent, wherein said crosslinking agent is present from about 10% by weight to 40% by weight of the reactant solution, said multifunctional crosslinking agent comprising butanediol diglycidyl ether or ethylene glycol diglycidylether;
    (f) contacting said cellulose membrane with said reactant solution forming an ultrafiltration cellulose membrane thereon;
    (g) crosslinking said ultrafiltration cellulose membrane on said support by reacting said multifunctional crosslinking agent in the reactant solution through hydroxyl groups in the cellulose under conditions whereby sufficient hydroxyl groups present in the cellulose are left unreacted resulting in a hydrophilic crosslinked cellulose nanofilter having a molecular weight cut-off of 200 Da, and
    (h) sealing the nanofilter in a pressure holding device.

12. The method of claim 11, wherein said cellulose solution comprises a cellulose ester solution.

13. The method of claim 11, further comprising attaching a negative surface charge or a positive surface charge to the surfaces of said hydrophilic crosslinked cellulose membrane in step (g).

14. The method of claim 11, wherein the pressure holding device includes a spiral wound module, a pleated cartridge, or a plate and frame type cassette.

15. A method of forming a pressure filtration holding device containing a hydrophilic crosslinked cellulose nanofilter used to remove or concentrate organic or inorganic solutes greater than about 200 Daltons from a feed solution, comprising:
- (a) providing a microporous support having an upstream facing side and downstream facing side, made from a polymer selected from polyethylene, polypropylene, polyether ether ketone, polyolefins, polyethylene terephthalate, fluorinated polymers, and ultrahigh molecular weight polyethylene;
- (b) providing a cellulose solution;
- (c) contacting said microporous support with said cellulose solution;
- (d) forming an integral ultrafiltration cellulose membrane having molecular weight cutoff (MWCO) values of 10,000 Daltons (D) or less on the upstream facing side of said support;
- (e) providing a reactant solution containing a multifunctional crosslinking agent, said multifunctional crosslinking agent comprising butanediol diglycidyl ether or ethylene glycol diglycidylether;
- (f) contacting said ultrafiltration cellulose membrane on said support with said reactant solution;
- (g) crosslinking said ultrafiltration cellulose membrane on said support by reacting said multifunctional crosslinking agent in the reactant solution through hydroxyl groups in the cellulose, under conditions whereby sufficient hydroxyl groups present in the cellulose are left unreacted resulting in a hydrophilic crosslinked cellulose nanofilter;
- (h) providing a pressure filtration holding device;
- (i) placing said nanofilter in said pressure filtration holding device; and
- (j) sealing the nanofilter in the device, wherein the upstream facing side of the nanofilter is the feed side and the downstream facing side of the nanofilter is the permeate side, such that when a feed solution stream is introduced to the upstream facing side, solutes greater than about 200 Daltons are retained on the upstream side of the nanofilter.

16. The method of claim 15, wherein the pressure holding device includes a spiral wound module, a pleated cartridge, or a plate and frame type cassette.

17. The method of claim 15, wherein said microporous support comprises an ultrahigh molecular weight polyethylene microporous membrane.

* * * * *